(12) United States Patent
Burago et al.

(10) Patent No.: US 7,698,637 B2
(45) Date of Patent: Apr. 13, 2010

(54) METHOD AND COMPUTER READABLE MEDIUM FOR LAYING OUT FOOTNOTES

(75) Inventors: Andrei Burago, Kirkland, WA (US); Sergey Genkin, Kirkland, WA (US); Eliyezer Kohen, Mercer Island, WA (US); Victor Kozyrev, Issaquah, WA (US); Anton Sukhanov, Redmond, WA (US); Igor Zverev, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 141 days.

(21) Appl. No.: 11/032,446

(22) Filed: Jan. 10, 2005

(65) Prior Publication Data

US 2006/0156225 A1 Jul. 13, 2006

(51) Int. Cl.
G06F 17/00 (2006.01)

(52) U.S. Cl. .................................... 715/266; 715/243

(58) Field of Classification Search ................. 715/500, 715/266, 243
See application file for complete search history.

(56) References Cited

U.S. PATENT DOCUMENTS

| | | | | |
|---|---|---|---|---|
| 4,503,515 A | * | 3/1985 | Cuan et al. ................. | 715/537 |
| 4,648,067 A | * | 3/1987 | Repass et al. .............. | 715/537 |
| 4,648,071 A | * | 3/1987 | Repass et al. .............. | 715/537 |
| 5,111,397 A | * | 5/1992 | Chirokas et al. ............ | 715/537 |
| 5,701,500 A | * | 12/1997 | Ikeo et al. .................. | 715/517 |
| 5,748,805 A | * | 5/1998 | Withgott et al. ............ | 382/306 |
| 2004/0006742 A1 | * | 1/2004 | Slocombe ................... | 715/513 |

OTHER PUBLICATIONS

Microsoft Word 2000 Screenshots (2 Figures).*
Word 2003 Screen Shots (3 Pages).*
Wilson et al., "ledmac a presumptuous attempt to port EDMAC, TABMAC and EDSTANZA to LaTeX," Apr. 9, 2004, (available at http://www.ctan.org/tex-archive/macros/latex/contrib/ledmac/ledmac.pdf).*
Internet Wayback Machine showing when Wilson et al. article was available.*

* cited by examiner

Primary Examiner—Boris Pesin
(74) Attorney, Agent, or Firm—Merchant & Gould

(57) ABSTRACT

A method and computer-readable medium are provided for laying out footnotes. Each footnote includes a footnote reference and corresponding footnote text. According to the method, an attempt is first made to lay out one or more footnotes such that each of the references and the corresponding text all fit completely within one page. If such a layout cannot be made, an attempt is may to lay out each of the footnotes such that all of the reference marks fit on the page and all but one of the corresponding note text fits completely on the page. If such a layout cannot be made, an emergency layout may be generated.

12 Claims, 8 Drawing Sheets

METHOD AND COMPUTER READABLE MEDIUM FOR LAYING OUT FOOTNOTES

BACKGROUND OF THE INVENTION

When working in an electronic document, footnotes (also referred to herein as "notes") are utilized to mark certain points in the text stream and to provide explanatory information about those points at a later position in the document. Footnotes typically consist of a footnote reference in the main body and footnote text at the bottom of the page corresponding to each reference. In many cases the footnote text is text that is not desirable to place in the main body of the document but which is of some interest to the reader.

It order to improve the readability of a document, it is desirable for footnote references to appear on the same page as their associated footnote text. However, when working with text layout on finite pages, situations arise when footnote references and their associated footnote text are difficult to place on the same page. When laying out footnotes on a page, there are three possible scenarios. In the first scenario, called the "ideal layout," the footnote reference and all of its footnote text fit on the same page. In the second scenario, the footnote reference and the beginning of its footnote text fit on the same page while the remainder of the footnote text is continued on one or more subsequent pages. Footnotes of this type are called "continued footnotes." In the third scenario, the footnote reference and all of its footnote text are on different pages. Footnotes of this type are called "separated footnotes." The first scenario is the most desirable outcome, the second scenario is acceptable, and the third is considered undesirable and should be avoided if possible. In another scenario, a layout may be generated that includes "broken footnotes." Broken footnotes are footnotes that are formatted in a way that produces an unacceptable layout. For instance, a layout may be generated in which images overlap footnotes, white space may be left on a page where a footnote clearly fits, footnote text may be lost, or footnotes may be laid out in the wrong order. Layouts including broken footnotes are highly undesirable.

Previous document processing applications were capable of laying out footnotes satisfactorily in many simple cases. However, the previous applications had a difficult time providing a satisfactory layout of footnotes in more complex cases. In particular, previous applications often failed to provide a satisfactory layout of footnotes where the document includes images that flow with text and multiple column formatting. In these situations, the previous applications often would generate a layout that included separated or broken footnotes. Improper layout of footnotes in this manner can be extremely frustrating for a user of the application program that expects the footnotes to be laid out properly for them.

It is with respect to these considerations and others that the various embodiments of the present invention have been made.

BRIEF SUMMARY OF THE INVENTION

In accordance with the present invention, the above and other problems are solved by a method and computer-readable medium for laying out footnotes. Through the use of the embodiments of the invention, footnotes may be laid out in a manner that eliminates the possibility of images overlapping footnotes and minimizes the occurrence of broken notes even when a page includes images that flow with text and multiple column formatting.

According to one embodiment of the invention, a document page containing footnotes is laid out in two parts, with each part being separated by a dividing line. The top part contains the body text, including any footnote references. The bottom part contains the corresponding footnote text for the footnote references. The dividing line serves as the bottom of the page for figures in the main text. Because the dividing line serves as the bottom of the page for figures, there is no possibility that figures can interfere with the footnote text part of the page. According to another embodiment of the invention, any number of columns may be utilized to format the parts of the page above and below the dividing line.

According to one embodiment of the invention, a computer-implemented method and computer-readable medium are provided for laying out footnotes comprising a footnote reference and corresponding footnote text. According to the method, a first attempt is made to generate an acceptable layout. During the first attempt, an attempt is made to find a layout such that an equal number of footnote references and their corresponding footnote text fit completely on the page, with no broken notes. A broken footnote is a footnote that either has footnote text that does not start on the same page as the corresponding footnote reference or a footnote that has footnote text that does not fit entirely on the same page as the footnote reference and must be continued to the next page.

In embodiments of the invention, attempting to find such a layout includes first laying out the footnote text for footnotes on the page, taking the minimum space. Once the footnote text has been laid out, the body text for the page is laid out in the space remaining on the page after laying out the possible footnotes, and allowing only the same footnote references as footnote text. A determination is then made as to whether the laid out body text includes the reference mark for each of the footnotes.

According to an embodiment of the invention, a second attempt is made at locating a good footnote layout if the first attempt fails. In particular, if the first attempt fails, an attempt is then made to find a layout such that all of the footnote references fit on the page and all but one footnote text note fits completely on the page. According to an embodiment of the invention, this may be accomplished by first laying out the body text for the page such that the smallest amount of space is used while still including the reference marks for the possible footnotes on the page. Once the body text has been laid out in this manner, the note text is laid out for the possible footnotes in the space remaining after the body text has been laid out. A determination is then made as to whether all but one of the footnote text fits completely on the page. If so, the layout is an acceptable one and it is utilized to lay out the footnotes.

According to one embodiment, a third attempt to lay out the footnotes may be made if the second attempt fails. The third attempt may be particularly suited to handle the case where two footnotes are positioned so closely together that a page cannot be broken between them (These types of footnotes are called "stickies" or "sticky" footnotes). For instance, footnote B is called a "sticky" footnote if there is another footnote A that precedes footnote B in the document and there is no way to break the page between them. Sticky footnotes are considered bad because they can lead to a footnote reference being separated from its corresponding footnote text. An attempt is made to layout sticky footnotes in a manner that reduces the possibility of this occurring. In particular, the occurrence of a sticky-footnote often leads to the choice between leaving a lot of empty space on a page (and postponing footnotes to the next page) or separating the stick footnote from its reference. The algorithms provided herein recognize the sticky footnotes and allow a client application to choose between the two possible layouts.

The invention may be implemented as a computer process, a computing system, or as an article of manufacture such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process.

These and various other features, as well as advantages, which characterize the present invention, will be apparent from a reading of the following detailed description and a review of the associated drawings.

DETAILED DESCRIPTION OF THE INVENTION

Figure 1:
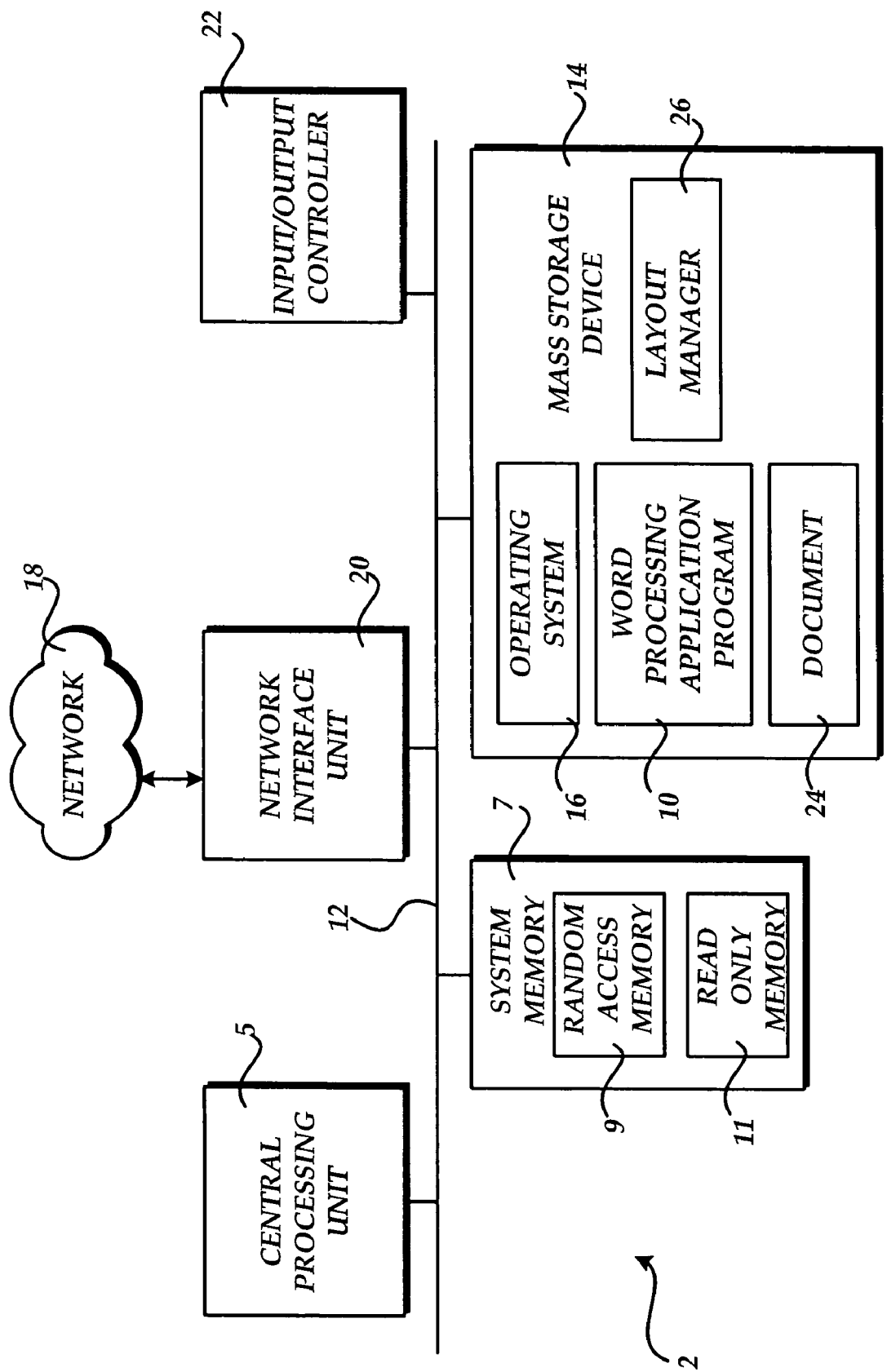
FIG. 1 is a computer system architecture diagram illustrating a computer system utilized in and provided by the various embodiments of the invention.

Referring now to the drawings, in which like numerals represent like elements, various aspects of the present invention will be described. In particular, FIG. 1 and the corresponding discussion are intended to provide a brief, general description of a suitable computing environment in which embodiments of the invention may be implemented. While the invention will be described in the general context of program modules that run on an operating system on a personal computer, those skilled in the art will recognize that the invention may also be implemented in combination with other types of computer systems and program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Referring now to FIG. 1, an illustrative computer architecture for a computer 2 utilized in the various embodiments of the invention will be described. The computer architecture shown in FIG. 1 illustrates a conventional desktop or laptop computer, including a central processing unit 5 ("CPU"), a system memory 7, including a random access memory 9 ("RAM") and a read-only memory ("ROM") 11, and a system bus 12 that couples the memory to the CPU 5. A basic input/output system containing the basic routines that help to transfer information between elements within the computer, such as during startup, is stored in the ROM 11. The computer 2 further includes a mass storage device 14 for storing an operating system 16, application programs, and other program modules, which will be described in greater detail below.

The mass storage device 14 is connected to the CPU 5 through a mass storage controller (not shown) connected to the bus 12. The mass storage device 14 and its associated computer-readable media provide non-volatile storage for the computer 2. Although the description of computer-readable media contained herein refers to a mass storage device, such as a hard disk or CD-ROM drive, it should be appreciated by those skilled in the art that computer-readable media can be any available media that can be accessed by the computer 2.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer 2.

According to various embodiments of the invention, the computer 2 may operate in a networked environment using logical connections to remote computers through a network 18, such as the Internet. The computer 2 may connect to the network 18 through a network interface unit 20 connected to the bus 12. It should be appreciated that the network interface unit 20 may also be utilized to connect to other types of networks and remote computer systems. The computer 2 may also include an input/output controller 22 for receiving and processing input from a number of other devices, including a keyboard, mouse, or electronic stylus (not shown in FIG. 1). Similarly, an input/output controller 22 may provide output to a display screen, a printer, or other type of output device.

As mentioned briefly above, a number of program modules and data files may be stored in the mass storage device 14 and RAM 9 of the computer 2, including an operating system 16 suitable for controlling the operation of a networked personal computer, such as the WINDOWS XP operating system from MICROSOFT CORPORATION of Redmond, Wash. The mass storage device 14 and RAM 9 may also store one or more program modules. In particular, the mass storage device 14 and the RAM 9 may store a word processing application program 10. As known to those skilled in the art, the word processing application program 10 is operative to provide functionality for creating and editing electronic documents, such as the document 24. According to one embodiment of the invention, the word processing application program 10 comprises the MICROSOFT WORD word processing application program from MICROSOFT CORPORATION. It should be appreciated, however, that other word processing application programs from other manufacturers may be utilized to embody the various aspects of the present invention. It should also be appreciated that other types of application programs that perform document layout functions may be utilized with the aspects of the present invention. For instance, the embodiments of the present invention may be utilized with desktop publishing programs, presentation programs, web browsers, and any other type of program that utilizes footnotes in a document.

In conjunction with the editing of a word processing document, the word processing application program 10 provides functionality for allowing a user to create footnotes within the document 24. Footnotes include a footnote reference and footnote text. The footnote text is located at a different location than the footnote reference. The word processing application program 10 may communicate with a layout manager 26 to assist in the formatting of the document 24, including the laying out of footnotes. As will be described in greater detail below, the layout manager 26 provides layout services to the word processing application program 10, and to any other program executing on the computer 2. In particular, the layout manager 26 performs an algorithm to lay out footnotes in a manner to avoid conflicting with other objects on a page of the document. Additional details regarding the operation of the layout manager 26 will be provided below with respect to FIGS. 2-4B.

Figure 2:
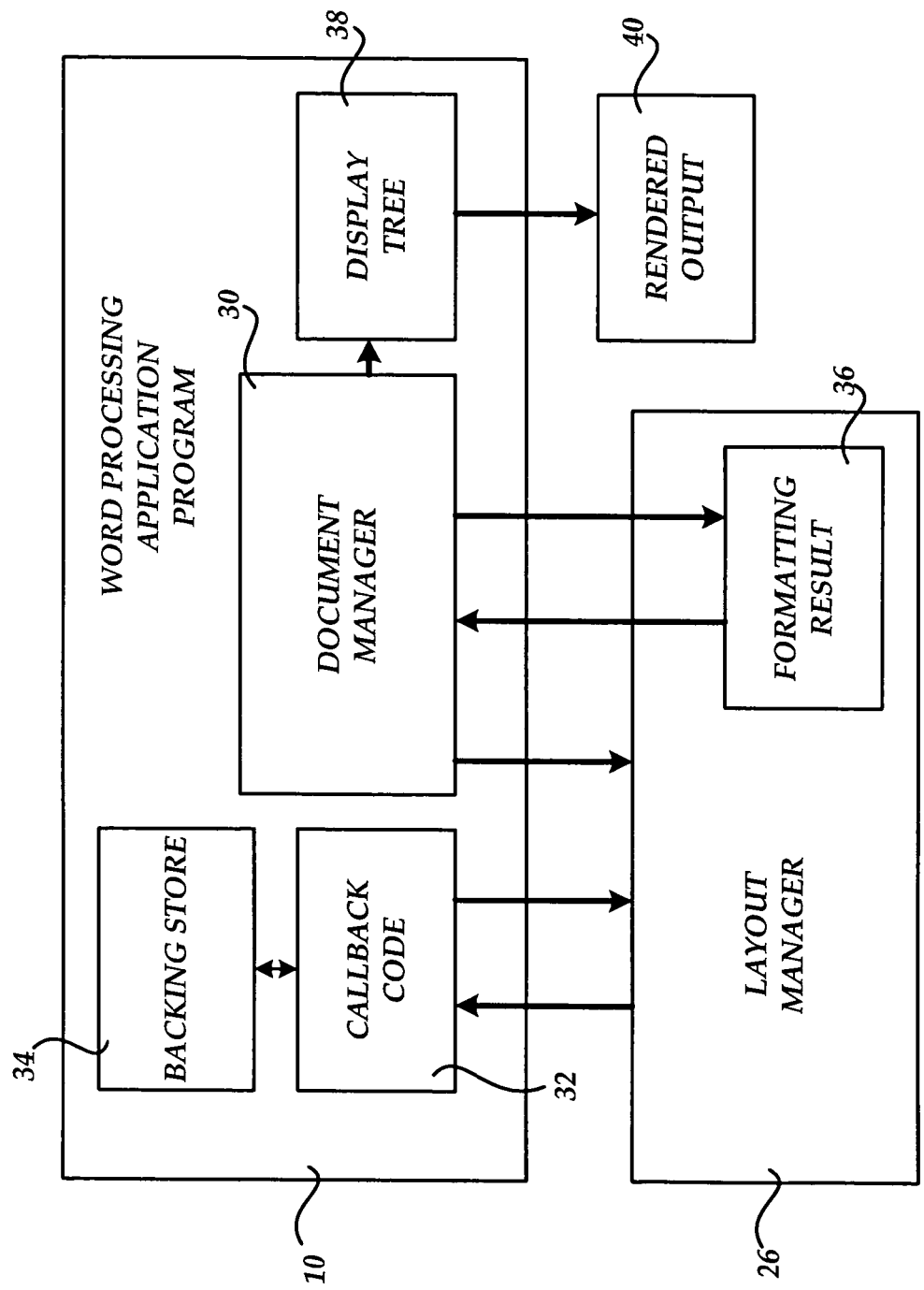
FIG. 2 is a software architecture diagram that illustrates aspects of several software components utilized in the embodiments of the invention.

Turning now to FIG. 2, additional details will be provided regarding the interaction between a client application, such as the word processing application program 10, and the layout manager 26. As described briefly above, the layout manager 26 provides document layout services to the application 10. In particular, the application 10 may communicate with the layout manager 26 to request the layout of portions of a document 24 stored in a backing store 34. In order to facilitate communication with the layout manager 26, the application 10 may implement one or more callback routines, illustrated in FIG. 2 as callback code 32. Through the use of the callback code 32, the layout manager 26 may query the application program 10 for additional information necessary to lay out various portions of the document.

As will be described in greater detail below, the layout manager 26 provides facilities for laying out footnotes. The layout manager 26 provides these facilities in response to a request from the application program 10 to lay out the footnotes. The document manager 30 of the application program 10 may communicate with the layout manager 26 to request that footnotes be laid out. The document manager 30 may also provide to the layout manager 26 the text from the document that should be laid into the footnotes. The document manager 30 may initially provide some of the content to the layout manager 26. The layout manager 26 may then request additional content from the callback code 32 as needed to layout the footnotes. The document manager 30 may also indicate to the layout manager 26 the style of the text to be laid out. For instance, the document manager 30 may indicate the typestyle, size, and other information necessary to lay out the text to the layout manager 26.

Once the layout manager 26 has laid out the footnotes in the manner described herein, the formatting result 36 is passed back to the document manager 30. In response to receiving the formatting result 36, the document manager 30 is operative to update the display tree 38 maintained by the application program 10. Based on the changes to the display tree 38, the application program 10 may update its rendered output 40 to display the formatting result to a user. It should be appreciate that different methodologies other than a display tree 38 may be utilized to by the application program 10 to update its output. Additional details regarding the operation of the application 10 and the layout manager 26 are provided below with respect to FIGS. 3-7.

Figure 3:
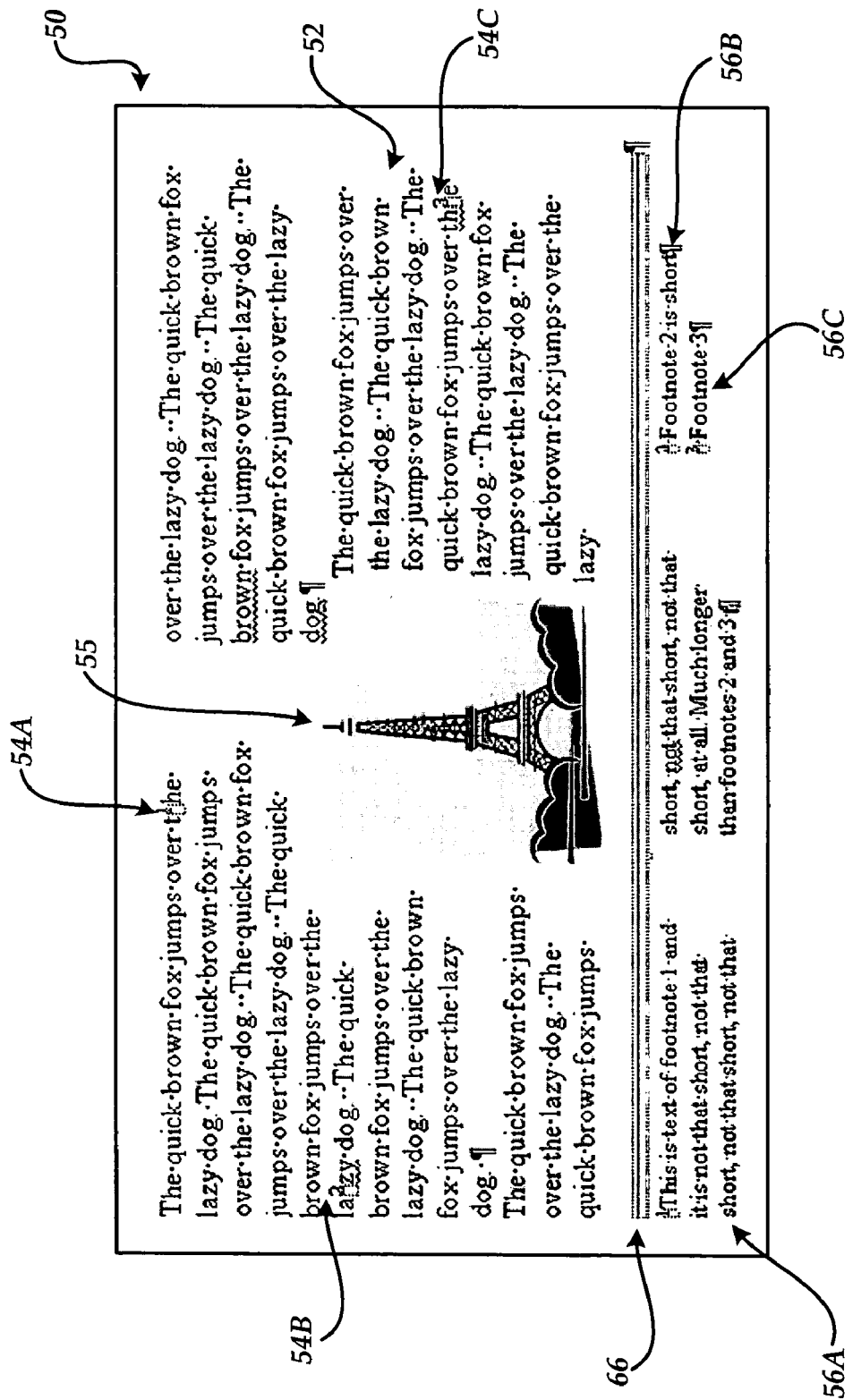
FIG. 3 is a page diagram illustrating a document page that includes footnotes formatted according to an embodiment of the invention.
Figure 4A:
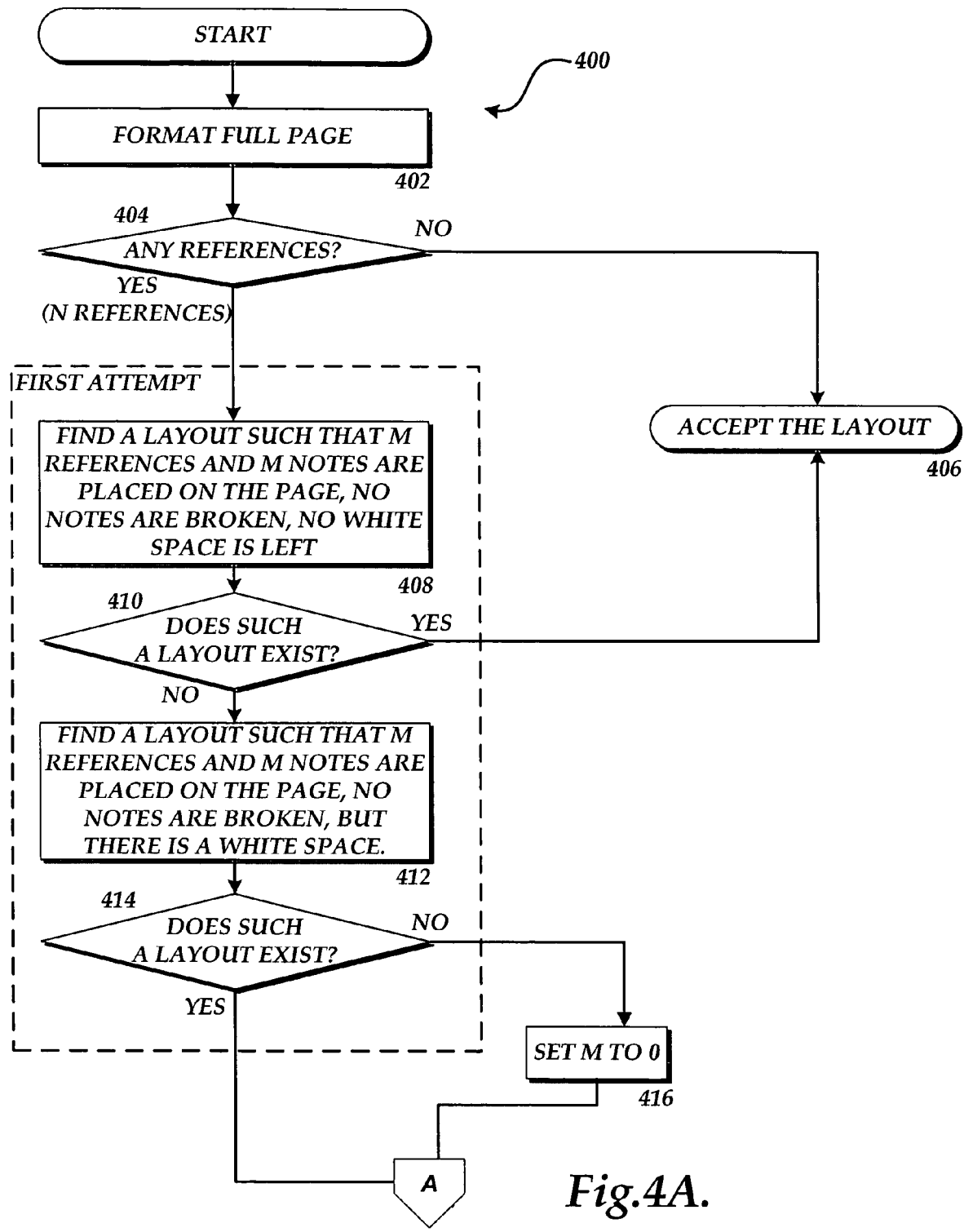
FIGS. 4A-7 are flow diagrams illustrating aspects of an exemplary method for laying out footnotes according to an embodiment of the invention.
Figure 4B:
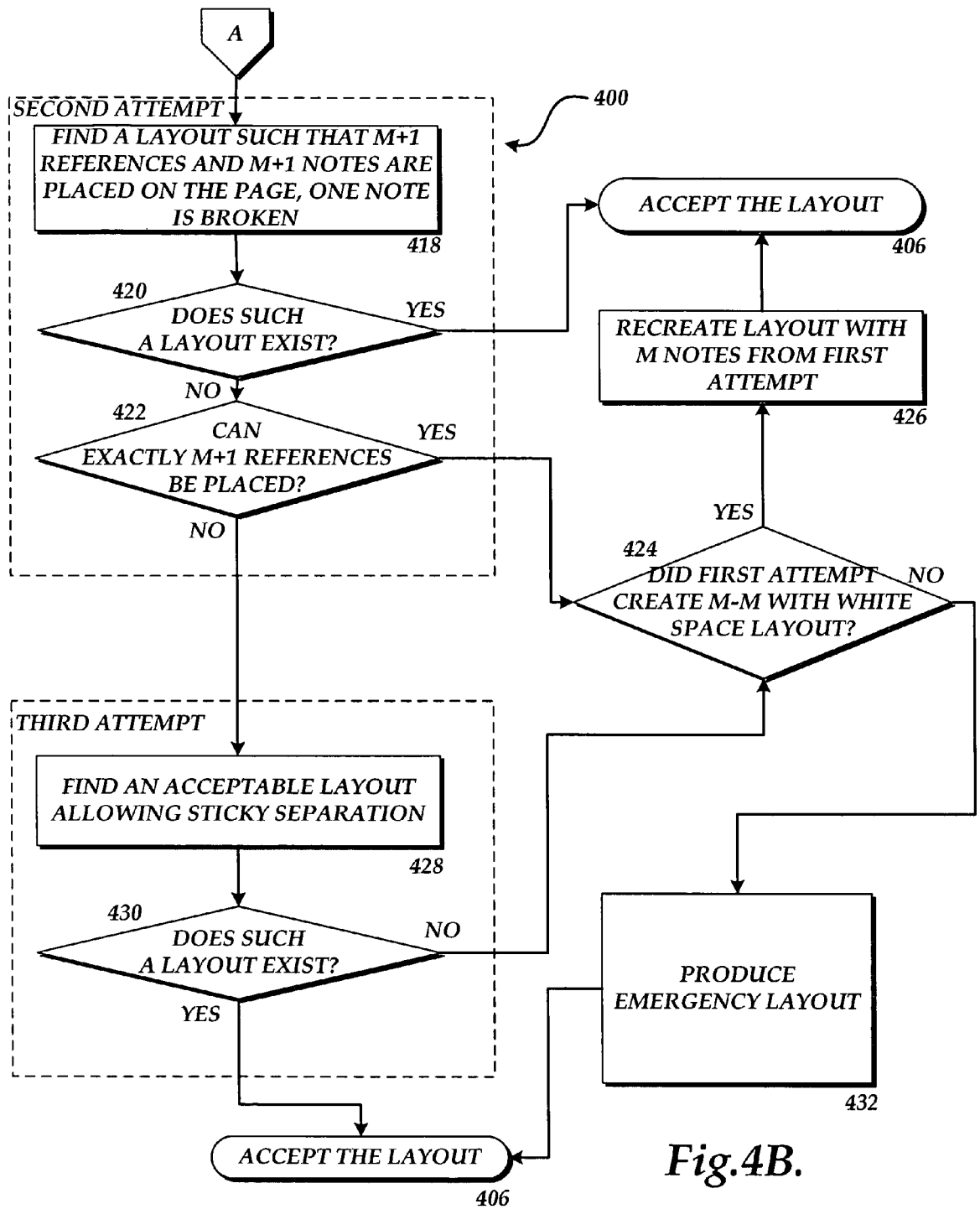

Turning now to FIG. 3, a page diagram illustrating a document page that includes footnotes formatted according to the embodiments of the invention will be described. In particular, FIG. 3 shows a page 50 of a document. The first page 50 includes body text 52 that includes three footnote references 54A-54C. A division line 66 separates the page 50 in two and provides a clear delineation between the body text 52 and the footnote text area of the page 50. The division line 66 also provides a dividing point between the footnote text area and any figures placed on the page, such as the FIG. 55. Because the division line serves as the bottom of the page for figures, no figures can be placed below the division line 66 and overlap the footnote text area of the page 50. It should also be appreciated that the note text area of the page may comprise any portion of the page 50.

In the example shown in FIG. 3, a footnote text area of the page 50 includes footnote text 56A corresponding to the reference mark 54A, footnote text 56B corresponding to the reference mark 54B, and footnote text 56C corresponding to the reference mark 54C. It should be appreciated that the body text area of the page 50 may be formatting into a different number of columns than the footnote text area. For instance, as shown in FIG. 3, the body text area of the page 50 is formatted in two column layout while the footnote text area of the page 50 is formatted in a three column layout. Moreover, the footnote text from one footnote may be started in one column and continued to other columns within the footnote text area. For instance, as shown in FIG. 3, the footnote text 56A begins in the first column and continues into the second column. The footnote text 56B and 56C are both in the third column.

It should also be appreciated that, although not shown in FIG. 3, broken footnotes may be generated. A broken footnote is a footnote that either has footnote text that does not start on the same page as the corresponding footnote reference or a footnote that has footnote text that does not fit entirely on the same page as the footnote reference and must be continued to the next page. As will be described in detail herein, the embodiments of the invention lay out the footnotes in a manner designed to minimize the possibility of broken footnotes.

Referring now to FIGS. 4A-7, several illustrative routines will be described illustrating a process performed by the layout manager 26 for laying out footnotes. It should be appreciated that although the embodiments of the invention described herein are presented in the context of a layout manager 26 and a word processing application program 10, the invention may be utilized in other types of application programs that support footnotes. For instance, the embodiments of the invention described herein may be utilized within a spreadsheet application program, a presentation application program, or a drawing or computer-aided design application program.

When reading the discussion of the routines presented herein, it should be appreciated that the logical operations of various embodiments of the present invention are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations illustrated in FIGS. 4A-7, and making up the embodiments of the present invention described herein are referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope of the present invention as recited within the claims set forth herein.

The routine 400 begins at operation 402, where the layout manager 26 formats the current page to determine the number of footnote references on the page. The variable N is utilized herein to refer to the number of footnote references on the page. The routine 400 then continues to operation 404, where a determination is made as to whether any footnote references are on the page (N>0). If there are no footnote references on the page (N=0), the routine 400 branches to operation 406, where the current layout for the page is accepted. If there are footnote references on the page, the routine 400 continues to operation 408.

Operations 408, 410, 412, and 414 represent a first attempt to generate an acceptable layout for the footnotes on the page. Additional details regarding the processing performed during the first attempt is provided below with respect to FIG. 5. At operation 408, the layout manager attempts to find a layout of the footnotes such that a variable M footnote references and M footnote text are placed on the page, with no broken notes and no white space left on the page. The routine 400 then continues from operation 408 to 410 where a determination is made as to whether such a layout exists. If such a layout does exist, the routine 400 branches to operation 406, where the current layout for the page is accepted. If such a layout does not exist, the routine 400 continues from operation 410 to operation 412.

At operation 412, an attempt is made to find a layout such that M references and M footnote text are placed on the page, but with white space on the page. The routine then continues to operation 414, where a determination is made as to whether such a layout exists. If such a layout does not exist, the routine 400 branches to operation 416, where the variable M is set to zero for use in the second attempt, described below. From operation 416, the routine 400 continues to operation 418. If such a layout does exist, the routine 400 continues directly from operation 414 to operation 418, described below. Additional details regarding the processing performed during the first attempt will be provided below with respect to FIG. 5.

Operations 418, 420, and 422 represent a second attempt to generate an acceptable layout for the footnotes on the page. Additional details regarding the processing performed during the second attempt is provided below with respect to FIG. 6. At operation 418, the layout manager attempts to find a layout such that M+1 references and M+1 footnotes are placed on the page with only one note being continued. The routine 400 then continues to operation 420, where a determination is made as to whether such a layout exists. If such a layout does exist, the routine 400 branches to operation 406 where the generated layout is accepted. If such a layout does not exist, the routine continues to operation 422, where a determination is made as to whether exactly M+1 footnote references can be placed on the page.

If it is determined at operation 422 that exactly M+1 footnote references can be placed on the page, the routine 400 branches to operation 424, where a determination is made as to whether the first attempt was able to generate a layout such that M footnote references and M footnote text are placed on the page, no notes are continued, but there is white space on the page, the routine 400 branches from operation 424 to operation 426. At operation 426, this layout from the first attempt is recreated. The routine 400 then continues to operation 406, where the layout is accepted. If the first attempt could not create such a layout, the routine 400 continues to operation 432, where an emergency layout is generated.

In order to perform the emergency layout, the page is formatted disallowing all footnote references. This is performed in a "force mode" which means that the formatter cannot return an empty page. Once the page has been formatted, a determination is made as to whether there are actually footnote references on the page. This is possible because an empty page is prohibited more strongly than footnote references. If there are footnotes, and there is also empty space left on the page, the portion of the footnote text that will fit on the page is placed on the page. It should be appreciated that it is a rare case to have to perform the emergency layout. Moreover, it should be appreciated that the results produced by the emergency layout may not be aesthetically pleasing. However, the emergency layout procedure is necessary to ensure that a layout is performed even in bad cases. It should be appreciated that even when an emergency layout is produced, a broken layout will not be generated. In particular, the layout may include much white space, some separated footnotes, but should not be broken.

From operation 432, the routine 400 then continues to operation 406, where the emergency layout is accepted. If it is determined at operation 422 that exactly M+1 footnotes cannot be placed on the page, the routine 400 continues to operation 428, described below. Additional details regarding the second attempt to generate an acceptable layout will be provided below with respect to FIG. 6.

Operations 428 and 430 represent a third attempt to generate an acceptable layout for the footnotes on the page. Additional details regarding the processing performed during the third attempt is provided below with respect to FIG. 7. It should be appreciated that the third attempt tries to handle sticky footnotes. These types of footnotes may be handled by separating the note reference from the note text and allowing the reference and text to be on different pages. In particular, at operation 428 an attempt is made to find an acceptable layout that allows the sticky footnotes to be separated. The routine 400 then continues to operation 430 where a determination is made as to whether such a layout could be located. If such a layout exists, the routine 400 continues from operation 430 to operation 406, where the layout is accepted. If such a layout does not exist, the routine 400 branches to operation 424, described above. Additional details regarding the third attempt to find a satisfactory layout will be provided below with respect to FIG. 7.

Figure 5:
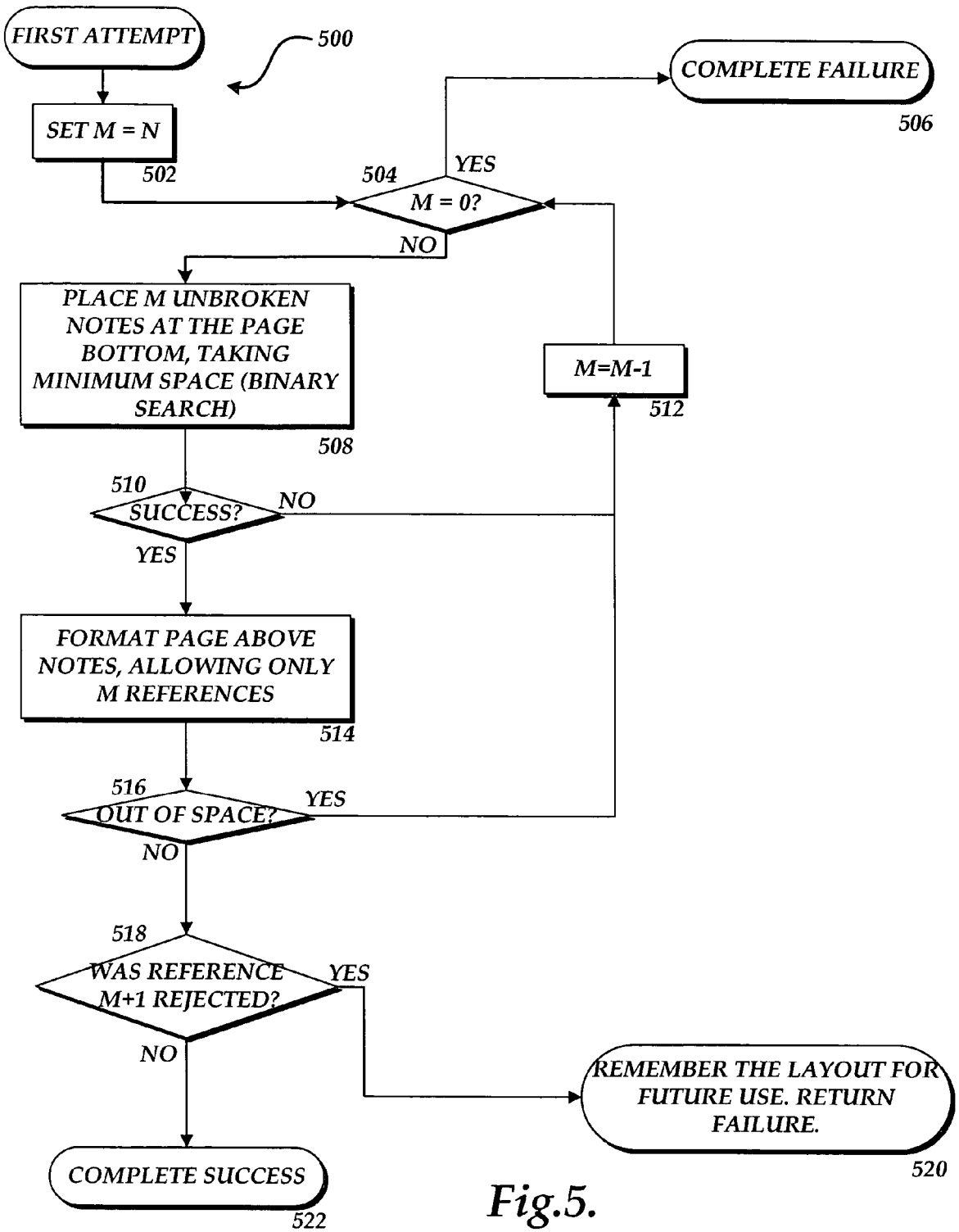

Turning now to FIG. 5, an illustrative routine 500 will be described that illustrates additional aspects of the first attempt to locate an acceptable layout of the footnotes described above with respect to operations 408, 410, 412, and 414. The routine 500 begins at operation 502, where the variable M is set to the value of the variable N. The routine 500 then continues to operation 504, where a determination is made as to whether M is equal to zero. If M is equal to zero, this indicates that an acceptable layout could not be found during the first attempt. Accordingly, the routine 500 branches to operation 506 if M is equal to zero. If M is not equal to zero, the routine 500 continues from operation 504 to operation 508.

At operation 508, an attempt is made to place the complete footnote text for M footnotes at the bottom of the page taking the minimum amount of space. If more than one column is present, a binary search algorithm may be utilized to format the footnote text into the desired number of columns. When only one column is utilized, the footnotes are simply formatted one after another according to the presentation order. This can provide a performance boost in the usual case. The routine 500 then continues from operation 508 to operation 510, where a determination is made as to whether the footnote text for M footnotes could be placed completely at the bottom of the page. If the footnote text for M footnotes could not be placed, the routine 500 branches from operation 510 to operation 512 where the value of M is decremented. From operation 512, the routine 500 continues to operation 504, described above.

If, at operation 510, it is determined that the footnote text could be placed completely at the bottom of the page the routine 500 continues to operation 514. At operation 514, the body text is formatted while allowing only M footnote references to be placed on the page. From operation 514, the routine 500 continues to operation 516, where a determination is made as to whether all of the space on the page has been exhausted prior to placing M footnote references on the page. If so, the routine 500 branches back to operation 512, described above. If not, the routine 500 continues from operation 516 to operation 518, where a determination is made as to whether the footnote reference for footnote M+1 was rejected to the next page. If the footnote reference M+1 was rejected, the routine 500 branches to operation 520, where the layout is retained for use in the second attempt. The fact that the reference has been rejected indicates that white space is present on the page. If the footnote reference M+1 was not rejected, then a good layout was found during the first attempt and the routine 500 continues to operation 522, where complete success is returned.

It should be appreciated that, the particular N footnotes that are laid out on each page are not necessarily the footnotes as ordered in the document. In particular, a rejection order may be specified that determines the order in which footnotes are "rejected" for the current page and moved to the next page when fitting them all on the same page is not possible. A placement order may also be specified that indicates the order in which footnotes should be placed on the page. In certain simple cases, the rejection and presentation orders may coincide with the ordering of the footnotes in the document. However, in more complex cases it may be useful to present and reject the footnotes in different orders.

Figure 6:
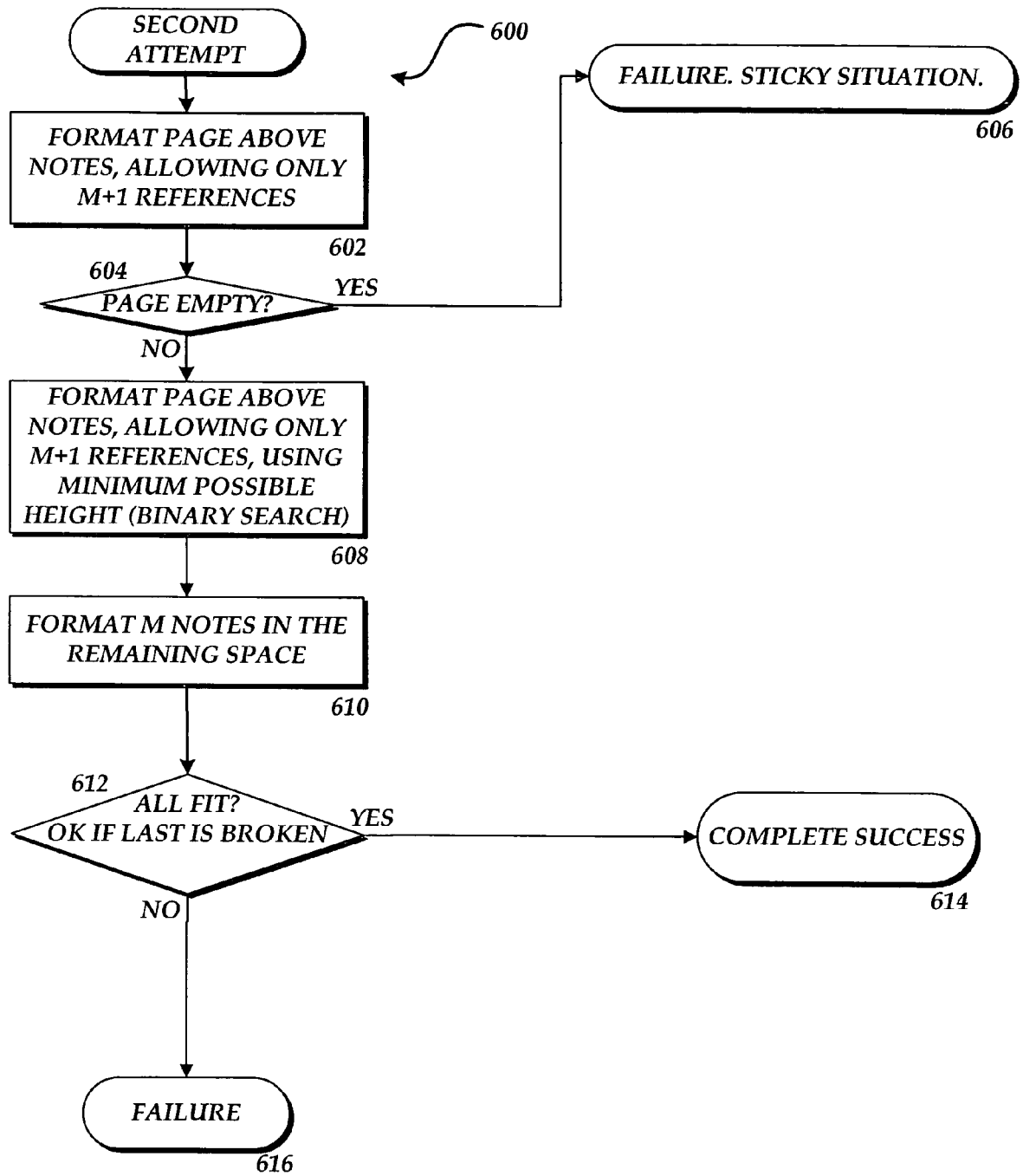

Referring now to FIG. 6, an illustrative routine 600 will be described that illustrates additional aspects of the second attempt to locate an acceptable layout of the footnotes described above with respect to operations 418, 420, and 422. In particular, the routine 600 begins at operation 602, where the body text is formatted while allowing only M+1 footnote references to be placed on the page. The routine then continues to operation 600 where a determination is made as to whether the page is empty. If the page is empty, this indicates that sticky footnotes are on the page with "footnote M+2 sticks to footnotes M+1" and the routine 600 branches to operation 606 where failure is reported and a third attempt is made to generate an acceptable layout.

If it is determined at operation 604 that the page is not empty, the routine 600 continues to operation 608, where the body text is formatted while allowing only M+1 footnote references to be placed on the page and using the minimum possible height for the text. The routine 600 then continues to operation 610 where the footnote text for M footnotes are formatted in the remaining space on the page. The routine 500 then continues to operation 612, where a determination is made as to whether all fit or all but one fit completely and one fits partially. If so, the routine 600 branches to operation 614, where complete success is reported. If not, the routine 600 continues to operation 616, where failure is reported.

Figure 7:
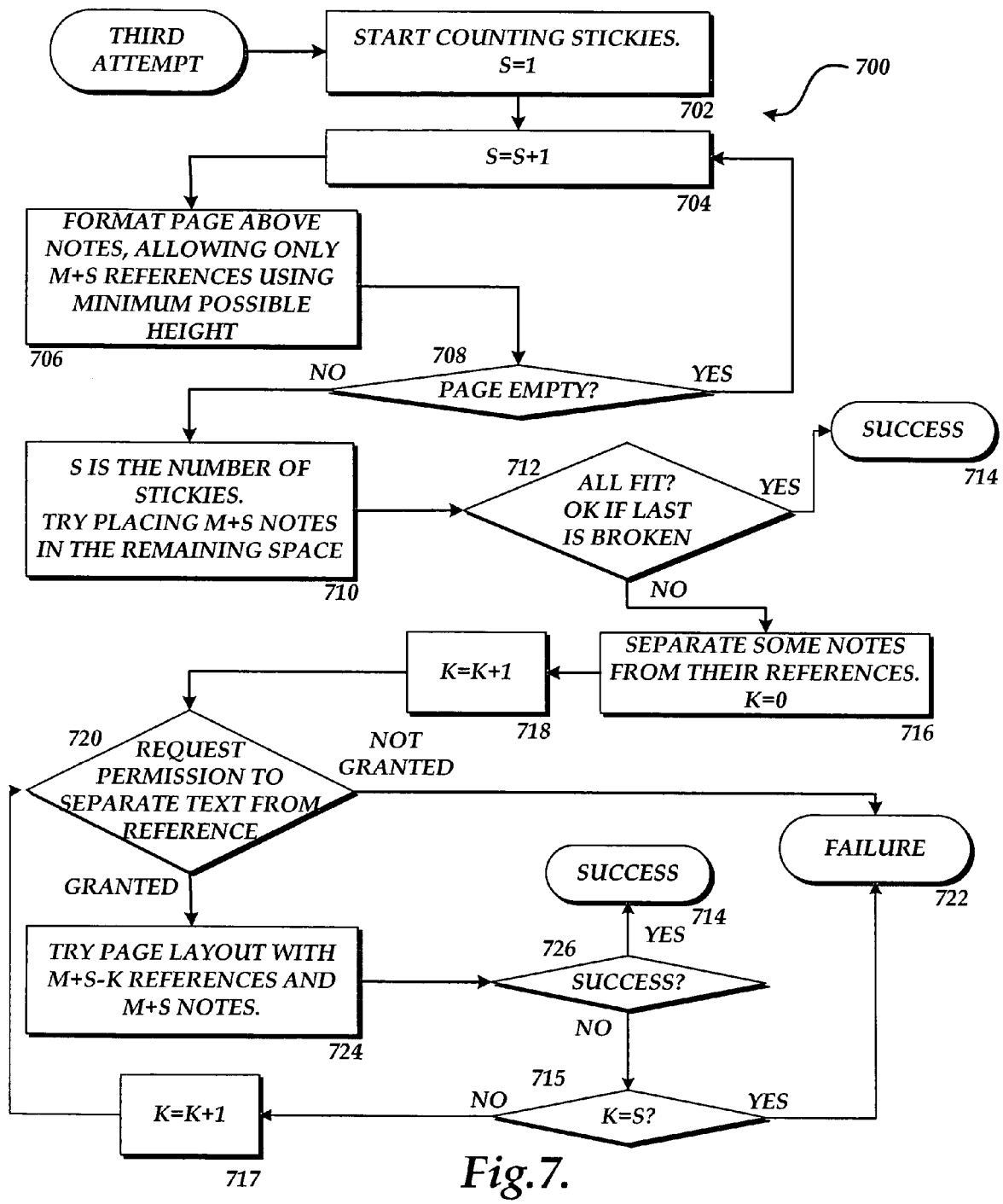

Turning now to FIG. 7, an illustrative routine 700 will be described that illustrates additional aspects of the third attempt to locate an acceptable layout of the footnotes described above with respect to operations 428 and 430. In particular, the routine 700 begins at operation 702, where a variable S is initialized for counting the number of sticky footnotes on the page. The routine 700 then continues to operation 704, where the value of S is incremented. From operation 704, the routine 700 continues to operation 706 where the body text is formatted allowing only M+S references on the page and using the minimum possible height. The routine 700 then continues to operation 708, where a determination is made as to whether the page is empty. If the page is empty, the routine 700 branches back to operation 704, described above, where the value of S is incremented.

If, at operation 708, it is determined that the page is not empty, the routine 700 continues to operation 710 where an attempt is made to place the footnote text for M+S footnotes on the page. The routine 700 then continues to operation 712 where a determination is made as to whether all fit or all but one fit completely and one fits partially. If so, the routine 700 branches from operation 712 to operation 714, where success is returned. If not, the routine 700 continues to operation 716 where a variable K is initialized representing the number of footnote references that have been separated from their corresponding footnote text. The routine 700 then continues to operation 718 where the value of K is incremented.

At operation 720, the layout manager 26 asks the client application 10 for permission to separate the footnote reference from its associated text. If the client application 10 does not grant permission, the routine 700 branches to operation 722, where failure is reported. If the client application 10 grants permission, the routine 700 continues to operation 724 where an attempt is made to generate a page layout having M+S-K footnote references and footnote text for M+S footnotes. If a successful layout was found, the routine 700 continues to operation 714, where success is reported. If a successful layout was not found, the routine 700 branches from operation 726 to operation 715, where a determination is made as to whether the value of the variable K is equal to the value of the variable S. If so, the routine 700 branches from operation 715 to operation 722. If K is less than S, the routine 700 branches to operation 717 where the value of K is incremented. From operation 717, the routine 700 returns to operation 720, described above.

It should be appreciated that the processing described above with respect to FIGS. 4A-7 lays out the footnotes for one page only. Additional passes through the various operations may be made to process the footnotes for all of the pages within a document. Moreover, although not described herein, additional processing may be performed to lay out the continued or separated footnotes originated on previous pages. It should also be appreciated that the processing illustrated in FIGS. 4A-7 is merely illustrative and that other processing routines may be utilized to lay out the footnotes for a given page.

Based on the foregoing, it should be appreciated that the various embodiments of the invention include a method, system, apparatus, and computer-readable medium for laying out footnotes. The above specification, examples and data provide a complete description of the manufacture and use of the composition of the invention. Since many embodiments of the invention can be made without departing from the spirit and scope of the invention, the invention resides in the claims hereinafter appended.

We claim:

1. A computer-implemented method for laying out at least one footnote comprising a footnote reference within body text and footnote text corresponding to each footnote reference on a page, the method comprising:

communicating, from a document manager to a layout manager, a request to layout the page, wherein communicating, from the document manager to the layout manager, comprises implementing callback routines comprising a callback code, the callback code enabling the layout manager to query the document manager for information necessary to lay out the page;

requesting, by the layout manager employing the callback code, for additional information regarding the page;

providing, by the document manager, to the layout manager the additional information comprising a style of text to be laid out, the style of text indicating a typestyle and a text size;

laying out the page by the layout manager, wherein laying out the page by the layout manager comprises:

laying out the body text including the at least one footnote reference;

laying out the footnote text for the at least one footnote reference on the page, the footnote text being laid out in at least one column;

determining whether the page includes an unacceptable amount of white space, the unacceptable amount of white space comprising an amount of white space capable of holding another complete footnote;

in response to determining that the page includes the unacceptable amount of white space, laying out the footnote text for the at least one footnote reference in at least one additional column;

placing a dividing line between the body text and the footnote text, the dividing line serving as a bottom of the page for a figure on the page and prohibits the figure from being placed below the dividing line;

determining whether an acceptable layout has been achieved;

determining if additional white space is available;

laying out the footnote text in the located available white space if it is determined that the acceptable layout has not been achieved; and displaying, on an electronic display device, the page.

2. The method of claim 1, wherein laying out the footnote text for the at least one footnote reference comprises laying out the footnote text for the at least one footnote reference on the same page as the footnote reference.

3. A computer-implemented method for laying out at least one footnote comprising a at least one footnote reference and at least one corresponding footnote text on a page, the method comprising:

receiving a request to layout the page, where receiving the request to layout the page comprises receiving a style of text to be laid out, the style of text indicating a typestyle and text size;

attempting to lay out the at least one footnote such that the at least one reference and the at least one corresponding footnote text for the at least one footnote fit completely on the page, wherein attempting to lay out the at least one footnote comprises:

laying out the at least one footnote on the page according to a presentation order, laying out body text for the page in a remaining space on the page after laying out the at least one footnote, determining if the laid out body text includes the at least one reference for the at least one footnote, in response to determining that the body text includes the at least one reference for the at least one footnote, then determining whether the page includes an unacceptable amount of white space, the unacceptable amount of white space comprising an amount of white space capable of holding another complete footnote, and in response to determining that the page includes the unacceptable amount of white space, laying out the footnote text for the at least one reference in at least one column;

in response to determining that the at least one reference and the at least one corresponding footnote text cannot be laid out on the page, attempting to lay out the at least one footnote such that only one footnote text is not displayed on the page while a corresponding footnote reference corresponding to the one footnote text is displayed on the page;

determining whether an acceptable layout has been achieved;

determining if additional white space is available;

laying out the at least one footnote text in the located available white space if it is determined that the acceptable layout has not been achieved; and displaying, on an electronic display device, the page.

4. The method of claim 3, further comprising:

in response to determining that the at least one footnote reference and the at least one corresponding footnote text cannot be laid out on the page identifying any footnotes that are too close together to be separated; and for each page note too close to another page note to be separated, attempting to generate a page layout where the single footnote reference for the at least one footnote is on a different page than the at least one corresponding footnote text for the at least one footnote.

5. The method of claim 3, further comprising attempting to lay out the at least one footnote such that all reference marks fit on the page and all but one corresponding footnote text fits completely on the page, wherein attempting to lay out the at least one footnote such that all reference marks fit on the page and all but one corresponding footnote text fits completely on the page comprises:

laying out the body text for the page such that the smallest amount of space is used and only the reference marks for possible footnotes are on the page;

laying out the footnote text for the possible footnotes in the space remaining after laying out the body text;

determining whether all but one of the possible footnotes fit completely on the page; and using the layout having all but one of the possible footnotes fit completely on the page if all but one of the possible footnotes fit completely on the page.

6. A computer-implemented method for laying out at least one footnote comprising note reference marks and corresponding note text on a page, the method comprising:

receiving a request to layout the page, where receiving the request to layout the page comprises receiving a style of text to be laid out, the style of text indicating a typestyle and text size;

formatting the page to determine a number of possible footnotes;

determining whether any footnotes exist to be placed on the page;

in response to determining that possible footnotes exist to be placed on the page, attempting to lay out each of the existing possible footnotes such that each of the reference marks and the corresponding note text for the possible footnotes fit completely on the page, wherein attempting to lay out the each of the possible footnotes such that each of the reference marks and the note text for the possible footnotes fit completely on the page comprises:

laying out the existing possible footnotes on the page, laying out body text for the page in a space remaining after laying out the existing possible footnotes such that the smallest amount of space is used and only the reference marks for the existing possible footnotes are on the page, determining if the laid out body text includes at least one reference mark for the laid out footnotes, in response to determining that the body text includes the at least one reference mark for the laid out footnotes, determining whether the page includes an unacceptable amount of white space, the unacceptable amount of white space comprising an amount of white space capable of holding another complete footnote, and in response to determining that the page includes the unacceptable amount of white space, laying out the footnote text for the at least one reference mark in at least one column;

determining whether each of the reference marks and the note text corresponding to each of the laid out footnotes could be laid out on the page, in response to determining that each of the reference marks and the note text corresponding to each of the laid out footnotes could not be laid out on the page, attempting to lay out each of the possible footnotes such that all of the reference marks fit on the page and all but one corresponding note text fits completely on the page;

determining whether an acceptable layout has been achieved;

determining if additional white space is available;

laying out the footnote text in the located available white space if it is determined that the acceptable layout has not been achieved; and displaying, on an electronic display device, the page.

7. The method of claim 6, further comprising in response to determining that the body text does not include the at least one reference mark for the laid out footnotes:

decrementing the number of possible footnotes for the page according to a rejection order, and repeating the operations of laying out the possible footnotes on the page; laying out the body text for the page in the space remaining after laying out the possible footnotes; determining if the laid out body text includes the at least one reference mark for the laid out footnotes; in response to determining that the body text includes the at least one reference mark for the laid out footnotes, then determining whether the page includes unacceptable amount of white space; and using the determined layout if the page does not include unacceptable amount of white space.

8. The method of claim 7, further comprising attempting to lay out each of the possible footnotes such that all reference marks fit on the page and all but one corresponding note text fits completely on the page, wherein attempting to lay out each of the possible footnotes such that all reference marks fit on the page and all but one corresponding note text fits completely on the page comprises:

laying out the body text for the page such that the smallest amount of space is used and only the reference marks for the possible footnotes are on the page;

laying out the note text for the possible footnotes in the space remaining after laying out the body text;

determining whether all but one of the possible footnotes fit completely on the page; and using the layout having reference marks fit on the page and all but one corresponding note text fits completely on the page if all but one of the possible footnotes fit completely on the page.

9. The method of claim 8, further comprising in response to determining that not all but one of the possible footnotes fit completely on the page:

decrementing the number of possible footnotes for the page according to the rejection order, and repeating the operations of laying out the body text for the page such that the smallest amount of space is used and only the reference marks for the possible footnotes are on the page; laying out the note text for the possible footnotes in the space remaining after laying out the body text; determining whether all but one of the possible footnotes fit completely on the page; and using the layout if all but one of the possible footnotes fit completely on the page.

10. The method of claim 9, further comprising:

determining whether the layout having reference marks fit on the page and all but one corresponding note text fits completely on the page was found such that all of the reference marks fit on the page and all but one corresponding note text fits completely on the page;

in response to determining that the layout having reference marks fit on the page and all but one corresponding note text fits completely on the page could not be found, identifying any footnotes that are too close together to be separated; and for each page note too close to another page note to be separated, attempting to generate a page layout where the note reference for a page note too close to another page note to be separated is on a different page than the note text for the page note.

11. The method of claim 10, further comprising:

determining whether a layout was identified wherein the note reference for the page note is on a different page than the note text for the page note, and in response to determining that such a layout was located, utilizing the layout otherwise generating an emergency layout.

12. A computer-implemented method for laying out a plurality of footnotes, each comprising a note reference mark and corresponding note text on a page, the method comprising:

communicating, from a document manager to a layout manager, a request to layout the page, wherein communicating, from the document manager to the layout manager, comprises implementing callback routines comprising a callback code, the callback code enabling the layout manager to query the document manager for information necessary to lay out the page;

requesting, by the layout manager employing the callback code, for additional information regarding the page;

providing, by the document manager, to the layout manager the additional information comprising a style of text to be laid out, the style of text indicating a typestyle and a text size;

laying out the page by the layout manager, wherein laying out the page comprises:

formatting the page to determine a number of possible footnotes;

determining whether any footnotes exist to be placed on the page;

in response to determining that at least one footnote exists to be placed on the page:

attempting to lay out the existing footnotes such that each of the note reference marks and the corresponding note text fits completely on the page, wherein attempting to lay out the existing footnotes that may be placed on the page such that each of the note reference marks and the corresponding note text fits completely on the page comprises:

laying out the existing footnotes on the page, laying out body text for the page in the space remaining after laying out the existing footnotes such that the smallest amount of space is used, determining if the laid out body text includes a corresponding reference mark for each of the existing footnotes, in response to determining that the body text does not include the reference mark for each of the possible footnotes, decrementing the number of possible footnotes for the page according to a rejection order, and repeating the operations of laying out the existing footnotes on the page;

in response to determining that the body text includes the reference mark for each of the existing footnotes, determining whether the page includes an unacceptable amount of white space, the unacceptable amount of white space comprising an amount of white space capable of holding another complete footnote, in response to determining that the page includes the unacceptable amount of white space, laying out the footnote text for the at the reference mark in at least one column, and using the footnote text layout when the page does not include the unacceptable amount of white space;

determining whether each of the reference marks and the note text could be laid out on the page, in response to determining that each of the reference marks and the note text could not be laid out on the page, attempting to lay out each of the existing footnotes that may be placed on the page such that all of the reference marks fit on the page and all but one corresponding note text fits completely on the page;

determining whether the layout having all of the reference marks fit on the page and all but one corresponding note text fits completely on the page was found;

in response to determining that the layout having all of the reference marks fit on the page and all but one corresponding note text fits completely on the page could not be found, identifying any footnotes that are too close together to be separated; and for each page note too close to another page note to be separated, attempting to generate a page layout where the note reference for a page note too close to another page note to be separated is on a different page than the note text for the page note;

determining whether an acceptable layout has been achieved;

determining if additional white space is available;

laying out the footnote text in the located available white space if it is determined that the acceptable layout has not been achieved; and displaying, on an electronic display device, the page.

\* \* \* \* \*